Nov. 6, 1956 — C. V. ANSLEY — 2,769,267
TRANSPARENT FISH LURE
Filed March 21, 1952
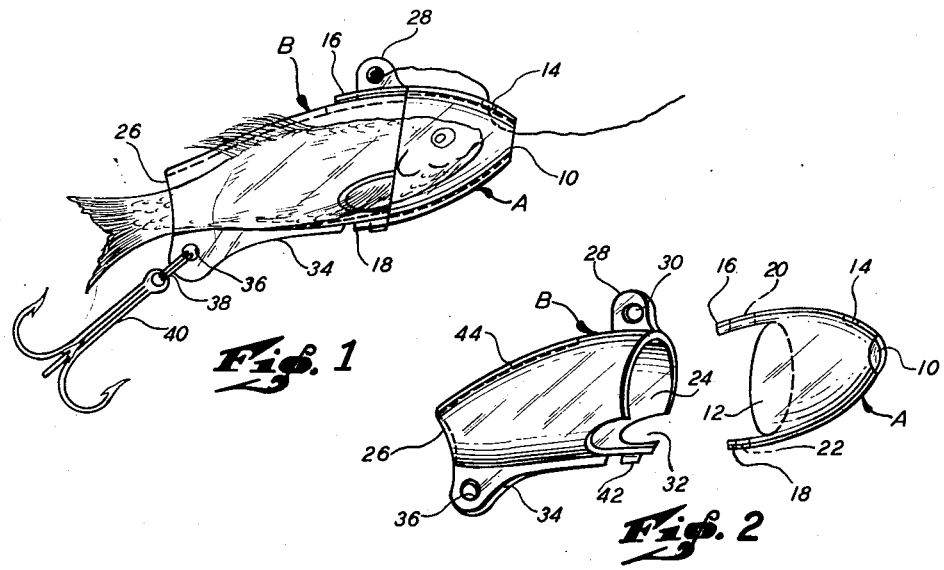
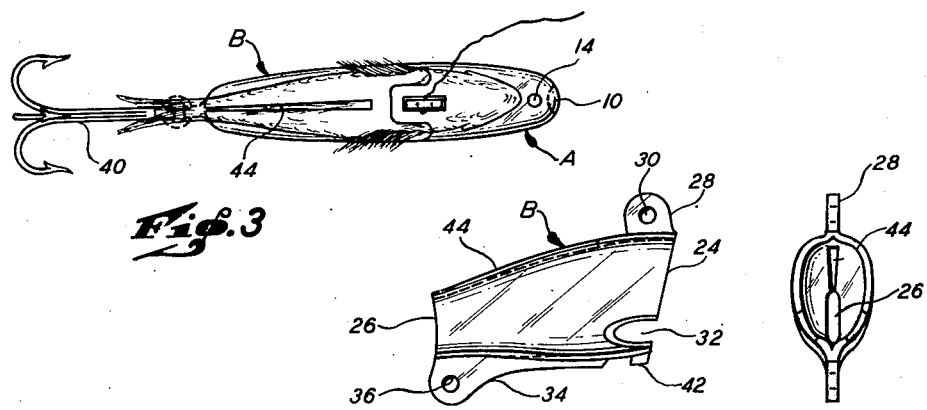
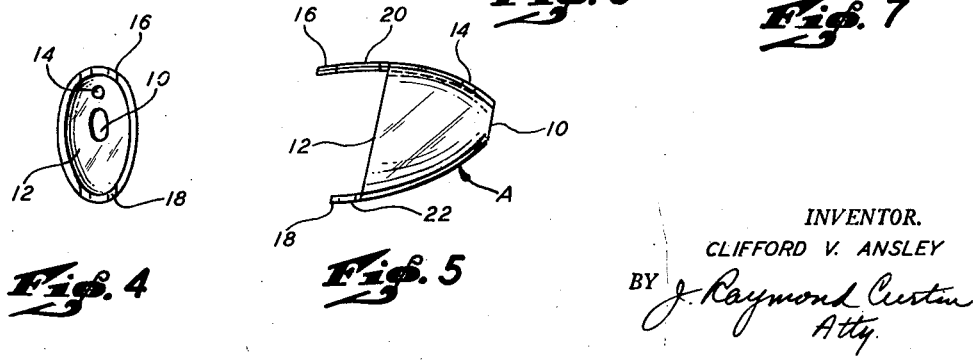
INVENTOR.
CLIFFORD V. ANSLEY
BY J. Raymond Curtin
Atty.

2,769,267
TRANSPARENT FISH LURE

Clifford V. Ansley, Syracuse, N. Y.

Application March 21, 1952, Serial No. 277,868

1 Claim. (Cl. 43—41)

This invention relates generally to fish lures and more particularly to that type of lure adapted to enclose live minnows or the like in a transparent housing. The lure usually has attached to its outer surface barbed hooks upon which a fish impales itself as it attempts to attack the minnow enclosed in the lure. The principal advantage of this form of lure is derived from the continuous use of the minnow or other small fish used as bait through the protection afforded by the transparent enclosure.

An object of this invention is to provide an improved lure of the type above described that is comprised of two transparent, tubular sections, each containing novel means adapted to cooperate to join the sections together in an end to end relationship once live bait has been inserted in one of the sections thereby locking the bait within the enclosure provided by the connected sections.

A further object of the invention consists in providing the two transparent sections comprising the lure with cooperating locking means that readily respond to slight pressure applications so that the sections are easily assembled and disassembled.

A still further object of this invention includes the provision of a fish line attaching eye means on the section locking element located on the top surface of the rear section of the lure.

Another feature of the invention includes the provision of means whereby an extremity of a fish line may be made fast to a section locking element while the free end of the line is threaded through openings in the front section so the lure may be utilized in a trolling operation.

Other and further objects will be apparent upon consideration of the specification and drawings, in which:

Fig. 1 is a side view of the assembled lure showing a minnow entrapped therein and a fish line as attached during a trolling operation.

Fig. 2 is a view in perspective of the front and rear sections of the lure in detached relationship.

Fig. 3 is a top view of the assembled lure showing a fish line as attached when the lure is used for still fishing.

Fig. 4 is an end view of the front section of the lure.

Fig. 5 is a side view of the front section.

Fig. 6 is a side view of the rear section.

Fig. 7 is an end view of the rear section.

The proposed fish lure is composed of two complimentary sections made of a transparent plastic material adapted to interlock with one another to form an enclosure for a minnow. The lure is assembled by inserting the minnow in one section and locking the second section to the first section to insure the presence of the minnow at all times within the enclosure formed by the sections. The lure also includes novel attachment means by which the lure can either be used for trolling or for still fishing.

For the purpose of illustrating the invention, reference is made to Figs. 1 and 2 which disclose a fishing lure composed of two component parts or sections A and B.

The forward or front section A is essentially a hollow tubular member substantially elliptical in cross section with openings 10 and 12 at the extremities thereof. Member A is tapered throughout its length so that opening 10 is considerably smaller than opening 12. Located in the top surface of member A is an opening 14, smaller in area than opening 10. The purpose of this opening 14 will be described later. Rearwardly disposed portions 16 and 18 containing slots 20 and 22 respectively are shown extending above and below opening 12. The slots 20 and 22 form a part of the novel fastening means to be described later.

The rear section B, designed to accommodate the major portion of the minnow as shown in Fig. 1, is also of a hollow tubular configuration, substantially elliptical in cross-section with a front opening 24 approximately equal in area to opening 12 of section A. Opening 26, smaller in area than opening 24, is at the rearward extremity of section B. A vertical lug 28 extends upwardly from the top surface of section B, and is disposed adjacent the end of section B that abuts section A. This lug contains a hole 30, for receiving a fish line. Fin accommodating recesses 32, are cut into section B adjacent the bottom of the opening 24. A projecting rib member 34, extends from the bottom of the section B as shown in Figs. 1, 2 and 6. This rib member includes an aperture 36, in which is disposed a retainer ring 38, that supports a barbed hook 40. Also located on the bottom surface of the member B is a rectangular shaped protuberance 42, adapted to cooperate with slot 22 in a manner to be set forth. A narrow tapered fin receiving slit 44 is milled or otherwise placed in the top surface of section B. This slit extends from the opening 26, along the top surface of section B to a point intermediate the forward extremity of section B. The slit has two functions, first, it aids in positioning a minnow in section B and it provides a tight fit between the fin on the minnow's back and the lure.

In assembling the device as described above, the minnow is placed in member B by inserting its tail through opening 24. Any portion of the minnow that may protrude through either slit 44 or opening 26 is pulled in a rearwardly direction until the minnow reaches the limit of its rearward travel. This limit is determined by the height and width of the minnow. The elliptical opening 26, of section B is, of course, smaller in area than the maximum sectional area of the minnow. Thus, the minnow is unable to escape through opening 26. Section A is then attached to section B by placing opening 12 in juxtaposition to opening 24. This is accomplished by slipping extended portion 16 over lug 28, so that slot 20 slides down over the lug. Slot 18 in extended portion 22 is then snapped over protuberance 42, thereby locking the sections together and firmly entrapping the minnow within the enclosure formed by the two sections. Elliptical opening 10 being smaller in area than opening 26, insures a continual flow of water into the lure so that the minnow can exist within the lure for an indefinite period.

To separate the two sections A and B, it is necessary only to apply a small amount of pressure to the front section with the thumb and forefinger. In response to this pressure, the slot 22 will be separated from protuberance 42 and extension 16 may be disengaged from lug 28. The sections being composed of a plastic material are pliable enough to withstand the small amounts of pressure necessary to effect the assembling and disassembling operation.

If it is desired to use the lure for still fishing, a conventional fish line is made fast to the vertical lug 28, by threading one end of the line through aperture 30 in the manner shown in Fig. 3. When it is desired to use the lure for trolling, one end of the fish line is made fast to the lug 28 as pointed out above and the other end is threaded over the outside of the lure through aperture 14, then inside the lure through opening 10 as illustrated in Fig. 1.

From the above description, it may be readily seen that there is provided a lure, assembled from a strong, transparent plastic material such as Lucite, capable of retaining a minnow or other small bait therein and protecting them against mutilation by fish that may attack them.

Although a minnow has been illustrated as the bait used in describing the invention, other forms of bait such as crabs, frogs, bass bugs and the like may be used. It is not intended to limit the use of this device to minnows only.

Since numerous changes may be made in the above disclosed construction, and since different embodiments of the invention may be made without departing from the scope of the invention, it is intended that all matter contained in the foregoing should be interpreted as illustrative and not in a limited sense.

I claim:

A fish lure comprising a hollow body including a first section of resilient material having openings provided in both ends with the forward end opening smaller than the rearward end opening, the first section being further provided with an aperture in the surface thereof intermediate the openings adapted to receive a fish line, and slotted extensions integrally connected to and extending rearwardly from the first section, a second section of resilient material having openings in both ends with the forward opening thereof being larger than the rearward opening thereof and of the same order as the rearward opening in the first section, an apertured vertical lug on the surface of the second section adjacent the forward opening of said second section for attachment thereto of a fish line, a protuberance on the surface of the second section, said second section being provided with recesses communicating with the forward opening thereof, said sections being adapted to be assembled in axial register with the edge of the rearward opening in the first section contiguous to and abutting the edge of the forward opening in the second section, portions of the edge of the rearward opening of said first section together with the edges of said recesses defining apertures in the walls of said hollow body communicating with the interior thereof.

References Cited in the file of this patent

UNITED STATES PATENTS

| | | |
|---|---|---|
| 212,920 | Fuller | Mar. 4, 1879 |
| 556,494 | Dales | Mar. 17, 1896 |
| 573,572 | Dales | Dec. 22, 1896 |
| 780,471 | Bakke | Jan. 17, 1905 |
| 1,038,866 | Fuller et al. | Sept. 17, 1912 |
| 1,288,118 | Morian | Dec. 17, 1918 |
| 1,719,343 | Strayer | July 2, 1929 |
| 2,467,971 | Frair | Apr. 19, 1949 |
| 2,476,553 | L'Huiller | July 19, 1949 |

FOREIGN PATENTS

| | | |
|---|---|---|
| 21,576 | Great Britain | 1912 |